(12) United States Patent
Choi et al.

(10) Patent No.: US 11,683,513 B2
(45) Date of Patent: Jun. 20, 2023

(54) PARTITIONING OF CODED POINT CLOUD DATA

(71) Applicant: TENCENT AMERICA LLC, Palo Alto, CA (US)

(72) Inventors: Byeongdoo Choi, Palo Alto, CA (US); Arash Vosoughi, San Jose, CA (US); Sehoon Yea, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 20 days.

(21) Appl. No.: 17/466,426

(22) Filed: Sep. 3, 2021

(65) Prior Publication Data

US 2021/0400292 A1    Dec. 23, 2021

Related U.S. Application Data

(63) Continuation of application No. 16/814,350, filed on Mar. 10, 2020, now Pat. No. 11,159,811.
(Continued)

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/172* (2014.11); *H04N 19/30* (2014.11)

(58) Field of Classification Search
None
See application file for complete search history.

(56) References Cited

U.S. PATENT DOCUMENTS

| 11,503,323 B2* | 11/2022 | Choi ................ H04N 19/109 |
| 2018/0268570 A1 | 9/2018 | Budagavi et al. |

(Continued)

FOREIGN PATENT DOCUMENTS

| KR | 10-2013-0098133 A | 9/2013 |
| WO | 2011/160010 A1 | 12/2011 |
| WO | 2019/013430 A1 | 1/2019 |

OTHER PUBLICATIONS

International Search Report in International Application No. PCT/US2020/022270, dated Jun. 10, 2020.
(Continued)

*Primary Examiner* — Talha M Nawaz
(74) *Attorney, Agent, or Firm* — Sughrue Mion, PLLC

(57) ABSTRACT

Systems and methods for encoding a video stream are provided. A method includes signaling partitioning information in a coded bitstream that is based on a point cloud. The coded bitstream may be a coded video stream that includes a frame of a plurality of two-dimensional (2D) pictures that are layers of the frame, each of the plurality of 2D pictures having a respective attribute of a same three-dimensional (3D) representation; frame partition information that indicates the frame is partitioned into a plurality of sub-frames, each of the plurality of sub-frames being a respective combination of a sub-region of each picture of the plurality of 2D pictures; and 3D bounding box information that specifies a 3D position corresponding to a sub-frame of the plurality of sub-frames.

20 Claims, 10 Drawing Sheets

Related U.S. Application Data

(60) Provisional application No. 62/819,504, filed on Mar. 15, 2019.

(51) Int. Cl.
  *H04N 19/172* (2014.01)
  *H04N 19/30* (2014.01)

(56) References Cited

U.S. PATENT DOCUMENTS

| | | | |
|---|---|---|---|
| 2019/0206071 A1 | 7/2019 | Yan et al. | |
| 2019/0371051 A1* | 12/2019 | Dore | G06T 7/50 |
| 2020/0074739 A1* | 3/2020 | Stauber | G06F 3/011 |
| 2020/0111267 A1* | 4/2020 | Stauber | G06F 3/017 |
| 2020/0202608 A1* | 6/2020 | Mekuria | H04L 65/80 |
| 2020/0314435 A1* | 10/2020 | Tourapis | G06T 7/74 |
| 2021/0165997 A1* | 6/2021 | Cai | G06T 7/73 |
| 2022/0262100 A1* | 8/2022 | Chandler | G06T 15/50 |

OTHER PUBLICATIONS

Written Opinion in International Application No. PCT/US2020/022270, dated Jun. 10, 2020.

Supplementary European Search Report dated Jul. 12, 2022 in Application No. 207734757.7.

Extended European Search Report dated Jun. 22, 2022 in Application No. 20773475.7.

Byeongdoo Choi et al., "[V-PCC] Proposed syntax design for frame partitioning", ISO/IEC JTC1/SC29/WG11 MPEG2019/M47899-v2, Mar. 2019, Geneva Switzerland (7 pages total).

Vladyslav Zakharchenko, "V-PCC Codec description", ISO/IEC JTC1/SC29/WG11 MPEG2019/N18190, Jan. 2019, Marrakech, MA (38 pages total).

Lauri Ilola, "Technologies Under Consideration for Carriage of Point Cloud Data", ISO/IEC JTC1/SC29/WG11 MPEG2018/N18267, Jan. 2019, Marrkesh, Morocco (23 pages total).

* cited by examiner

356

352

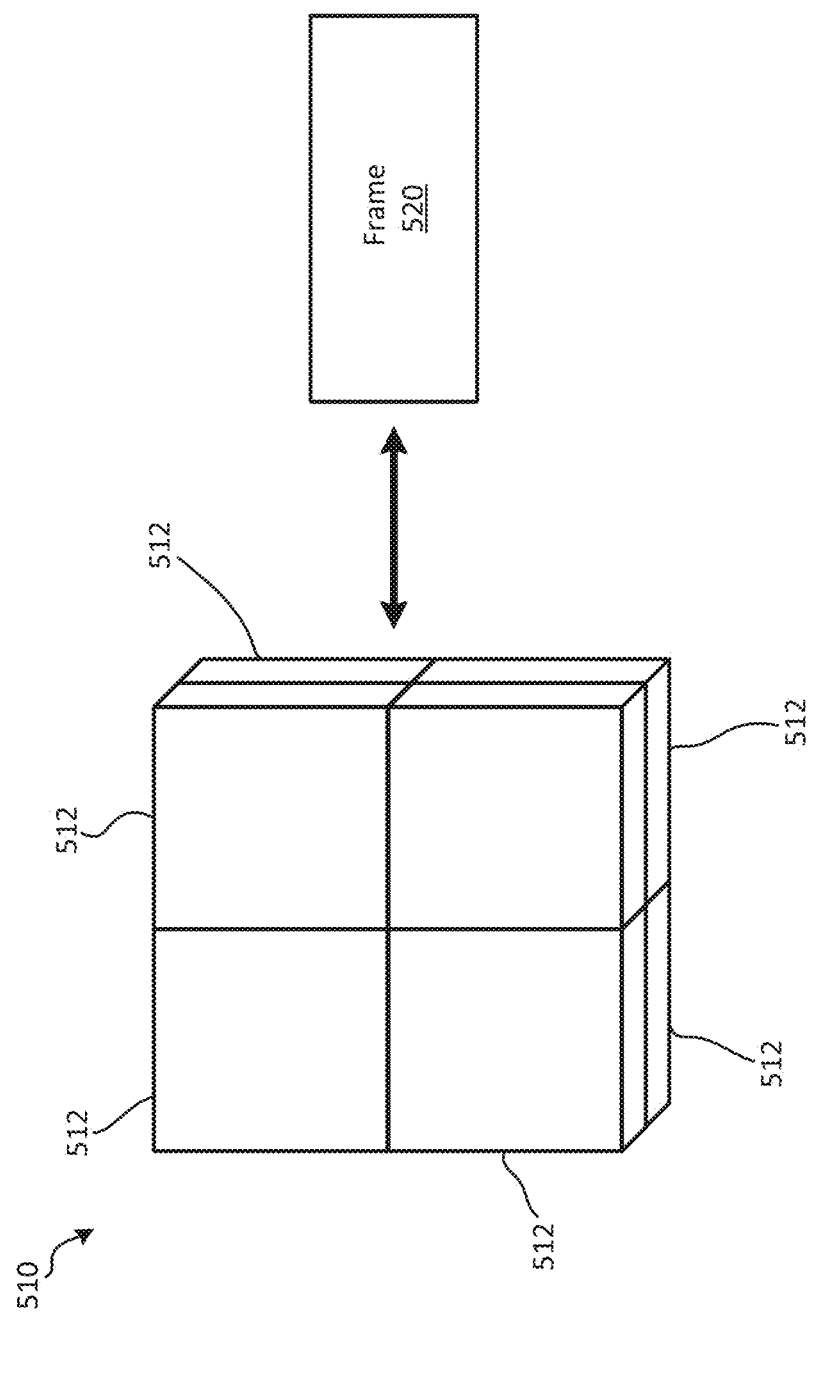

PARTITIONING OF CODED POINT CLOUD DATA

CROSS-REFERENCE TO THE RELATED APPLICATIONS

This application is a Continuation Application of U.S. patent application Ser. No. 16/814,350, filed Mar. 10, 2020, which claims priority from U.S. Provisional Application No. 62/819,504, filed on Mar. 15, 2019, the disclosures of which are incorporated herein by reference in their entirety.

FIELD

This disclosure is directed to a set of advanced video coding technologies, more specifically, video based point cloud compression.

BACKGROUND

Advanced three-dimensional (3D) representations of the world are enabling more immersive forms of interaction and communication. They also allow machines to understand, interpret, and navigate our world. Point clouds have been widely used as a 3D representation of the world. Several use cases associated with point cloud data have been identified, and some corresponding requirements for point cloud representation and compression have been developed.

SUMMARY

Some embodiments of the present disclosure provide techniques for signaling of partitioning information in a coded point cloud bitstream. A video-based point cloud compression (V-PCC) scheme of the present disclosure may utilize generic video codecs for point cloud compression. Some embodiments of the present disclosure provide a functionality enabling partial encoding, delivery, and decoding of the coded point cloud bitstream.

In one or more embodiments, a method performed by at least one processor is provided. The method includes encoding a video stream. The encoded video stream includes: a frame of a plurality of two-dimensional (2D) pictures that are layers of the frame, each of the plurality of 2D pictures having a respective attribute of a same three-dimensional (3D) representation, frame partition information that indicates the frame is partitioned into a plurality of sub-frames, each of the plurality of sub-frames being a respective combination of a sub-region of each picture of the plurality of 2D pictures, and 3D bounding box information that specifies a 3D position corresponding to a sub-frame of the plurality of sub-frames. The method further includes sending the encoded video stream to a decoder.

According to an embodiment, the frame partition information, of the encoded video stream, includes 2D bounding box information that specifies at least one among a position and boundary of the sub-frame in the frame.

According to an embodiment, the 3D bounding box information specifies a 3D position of a 2D bounding box specified in the 2D bounding box information, and the encoding the video stream includes generating the encoded video stream, including the 3D bounding box information, based on a point cloud.

According to an embodiment, the plurality of 2D pictures includes a first picture, a second picture, and a third picture, the first picture being a texture image, the second picture being a geometry image, and the third picture being an occupancy map.

According to an embodiment, the encoding the video stream includes generating the encoded video stream, including the 3D bounding box information, based on a point cloud.

According to an embodiment, the plurality of 2D pictures includes a first picture, a second picture, and a third picture, the first picture being a texture image, the second picture being a geometry image, and the third picture being an occupancy map.

According to an embodiment, the encoding the video stream includes signaling in the encoded video stream whether the sub-frame may be independently decoded from other sub-frames of the plurality of sub-frames.

According to an embodiment, the encoded video stream includes a frame parameter set that includes the frame partition information and the 3D bounding box information.

According to an embodiment, the plurality of 2D pictures includes a first picture, a second picture, and a third picture, the first picture being a texture image, the second picture being a geometry image, and the third picture being an occupancy map.

According to an embodiment, the encoded video stream further includes an additional frame of a plurality of 2D pictures that are layers of the additional frame, each of the plurality of 2D pictures of the additional frame having a respective attribute of a same additional 3D representation, and the frame partition information indicates that the additional frame is partitioned into a plurality of sub-frames.

According to one or more embodiment, a system is provided. The system includes: memory configured to store computer program code; and at least one processor configured to access the computer program code, and operate as instructed by the computer program code, wherein the computer program code is configured to cause the at least one processor to encode a video stream and send the encoded video stream to a decoder. The encoded video stream includes: a frame of a plurality of two-dimensional (2D) pictures that are layers of the frame, each of the plurality of 2D pictures having a respective attribute of a same three-dimensional (3D) representation, frame partition information that indicates the frame is partitioned into a plurality of sub-frames, each of the plurality of sub-frames being a respective combination of a sub-region of each picture of the plurality of 2D pictures, and 3D bounding box information that specifies a 3D position corresponding to a sub-frame of the plurality of sub-frames.

According to an embodiment, the frame partition information, of the encoded video stream, includes 2D bounding box information that specifies at least one among a position and boundary of the sub-frame in the frame.

According to an embodiment, the 3D bounding box information specifies a 3D position of a 2D bounding box specified in the 2D bounding box information, and the computer program code is further configured to cause the at least one processor to generate the encoded video stream, including the 3D bounding box information, based on a point cloud.

According to an embodiment, the plurality of 2D pictures includes a first picture, a second picture, and a third picture, the first picture being a texture image, the second picture being a geometry image, and the third picture being an occupancy map.

According to an embodiment, the computer program code is further configured to cause the at least one processor to generate the encoded video stream, including the 3D bounding box information, based on a point cloud.

According to an embodiment, the plurality of 2D pictures includes a first picture, a second picture, and a third picture, the first picture being a texture image, the second picture being a geometry image, and the third picture being an occupancy map.

According to an embodiment, the computer program code is further configured to cause the at least one processor to signal in the encoded video stream whether the sub-frame may be independently decoded from other sub-frames of the plurality of sub-frames.

According to an embodiment, the encoded video stream includes a frame parameter set that includes the frame partition information and the 3D bounding box information.

According to an embodiment, the plurality of 2D pictures includes a first picture, a second picture, and a third picture, the first picture being a texture image, the second picture being a geometry image, and the third picture being an occupancy map.

According to one or more embodiments, a non-transitory computer-readable medium storing computer instructions is provided. The computer instructions, when executed by at least one processor, cause the at least one processor to encode a video stream that includes: a frame of a plurality of two-dimensional (2D) pictures that are layers of the frame, each of the plurality of 2D pictures having a respective attribute of a same 3D representation, frame partition information that indicates the frame is partitioned into a plurality of sub-frames, each of the plurality of sub-frames being a respective combination of a sub-region of each picture of the plurality of 2D pictures, and 3D bounding box information that specifies a 3D position corresponding to a sub-frame of the plurality of sub-frames. The computer instructions, when executed by the at least one processor, further cause the at least one processor to send the encoded video stream to a decoder.

BRIEF DESCRIPTION OF THE DRAWINGS

Further features, the nature, and various advantages of the disclosed subject matter will be more apparent from the following detailed description and the accompanying drawings in which:

FIG. 7 is a diagram illustrating a 3D point cloud frame and a frame, corresponding to the 3D point cloud frame, in accordance with an embodiment.

DETAILED DESCRIPTION

A point cloud is a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

Compression technologies are needed to reduce the amount of data required to represent a point cloud. As such, technologies may be needed for lossy compression of point clouds for use in real-time communications and six Degrees of Freedom (DoF) virtual reality. In addition, technology is sought for lossless point cloud compression in the context of dynamic mapping for autonomous driving and cultural heritage applications, etc. MPEG has started working on a standard to address compression of geometry and attributes such as colors and reflectance, scalable/progressive coding, coding of sequences of point clouds captured over time, and random access to subsets of the point cloud.

The main philosophy behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
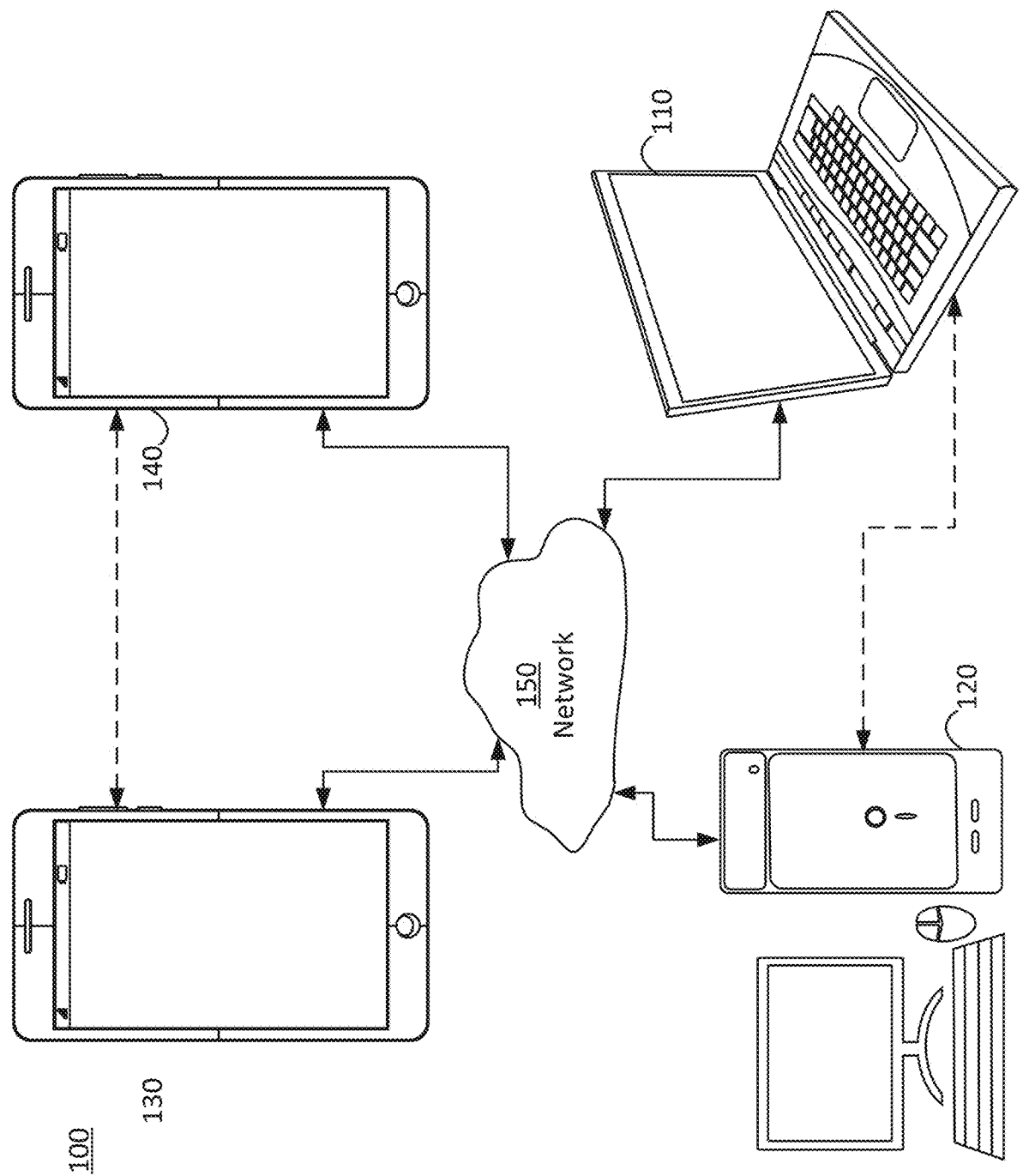
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
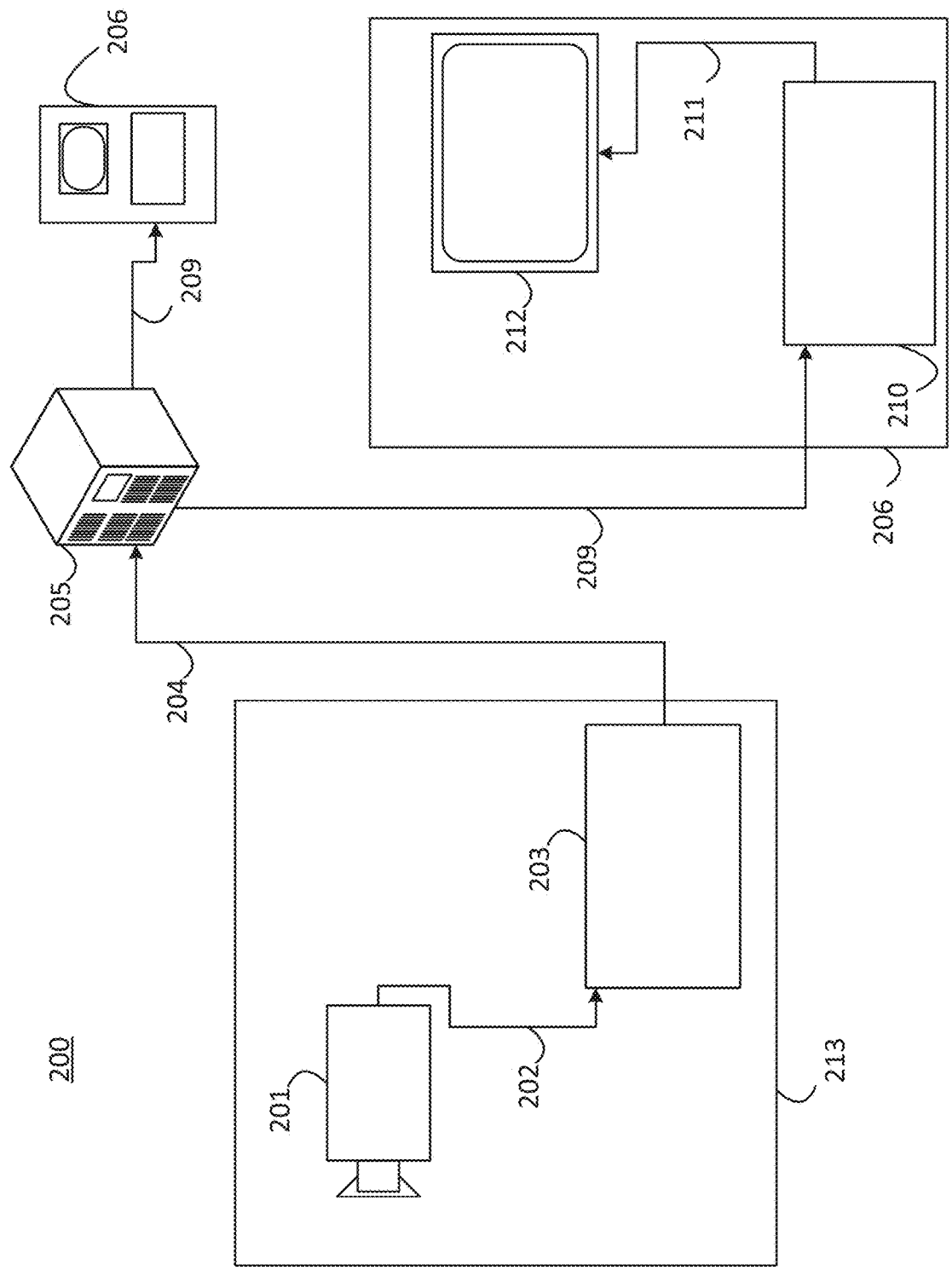
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
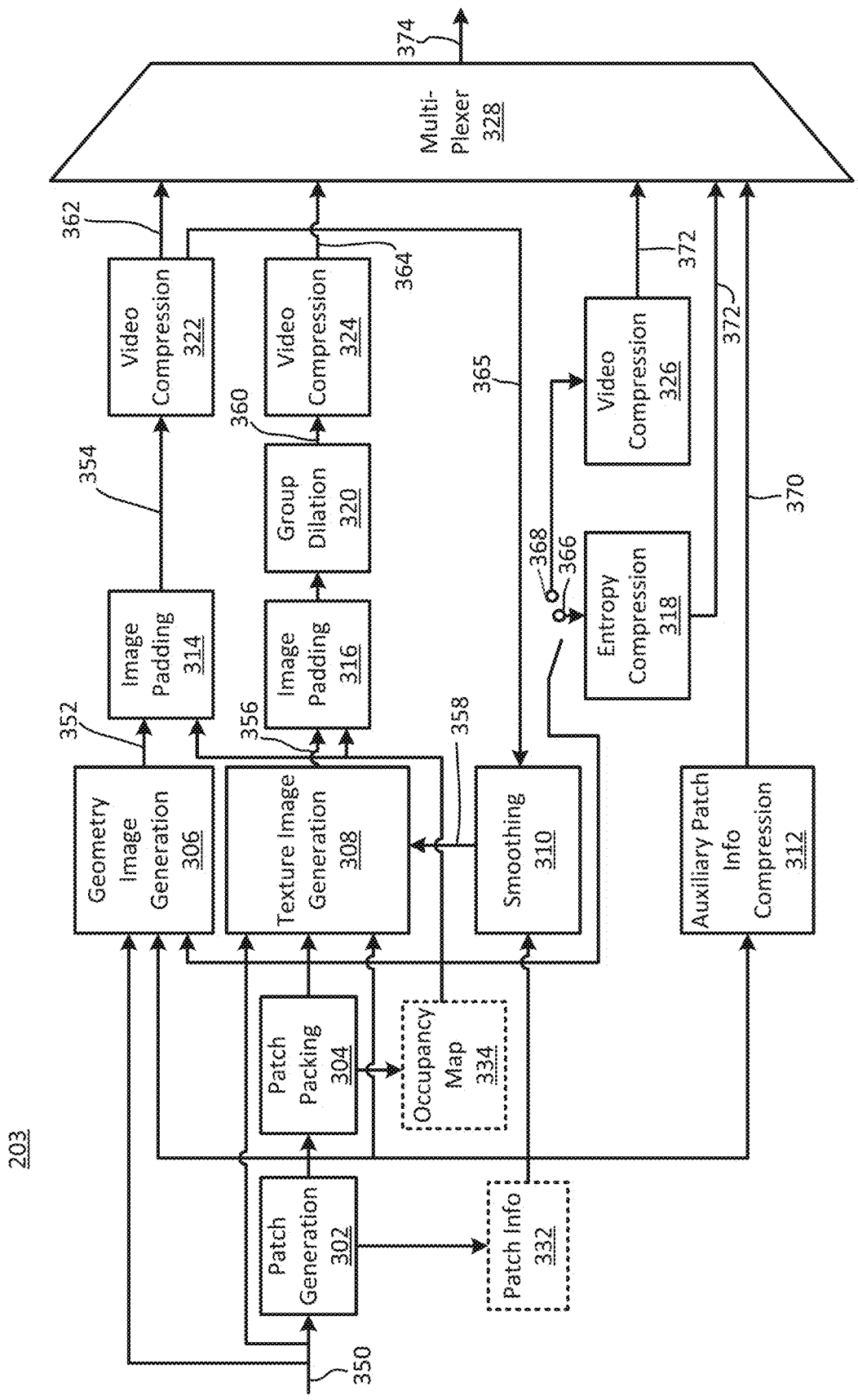
FIG. 3 is a schematic illustration of a simplified block diagram of a video encoder in accordance with an embodiment.
Figure 4:
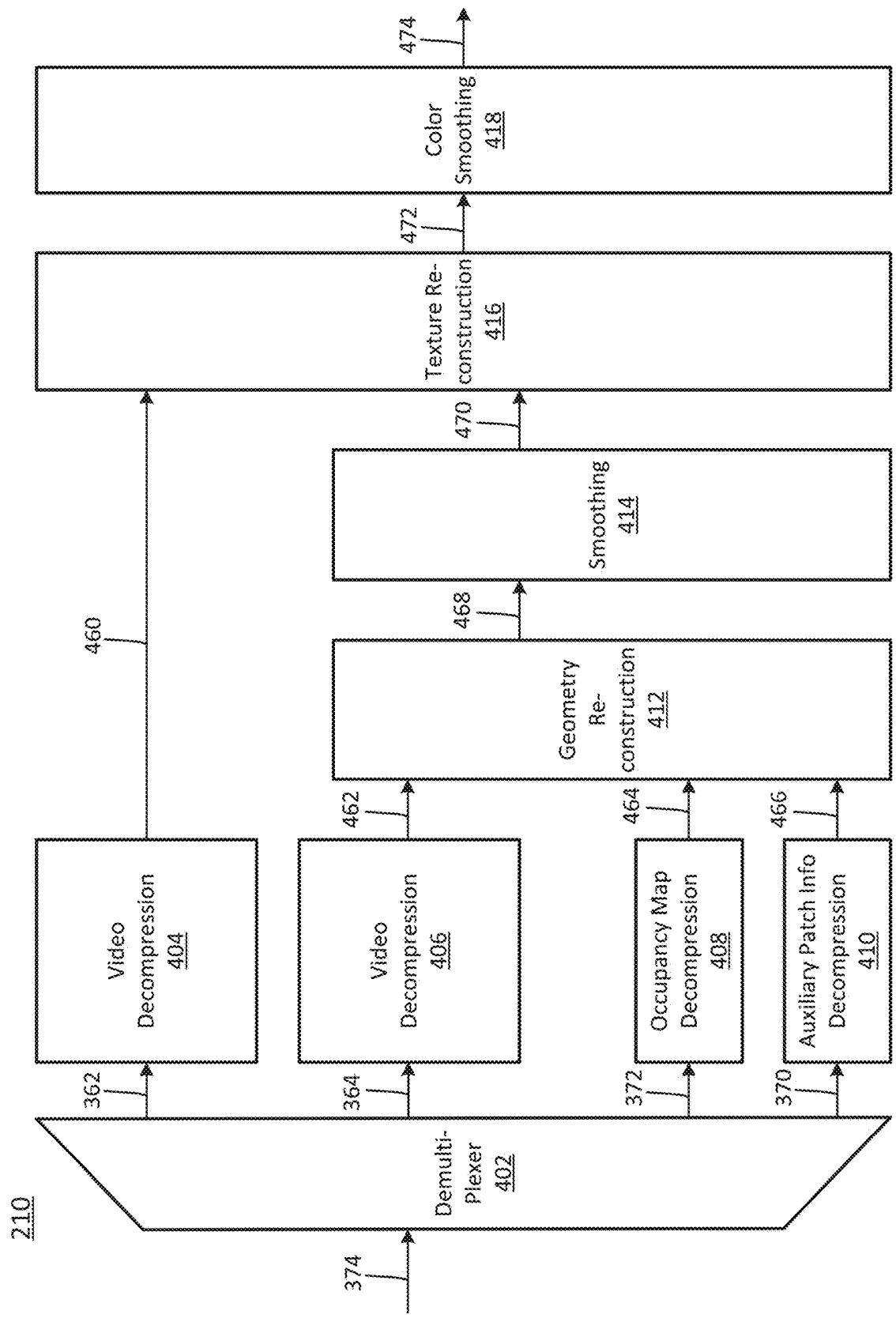
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

Figure 6:
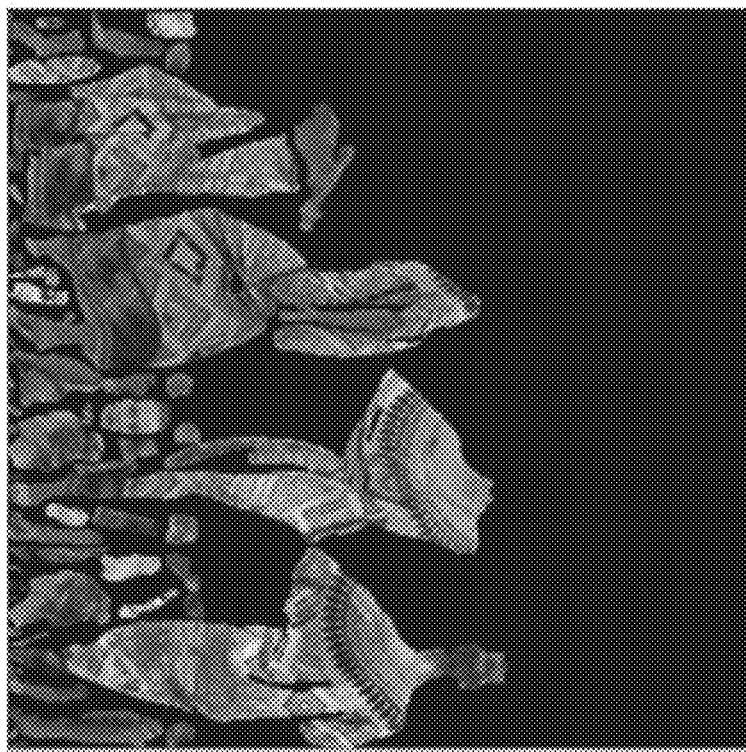
FIG. 6 illustrates an example of a texture image in accordance with an embodiment.
Figure 5:
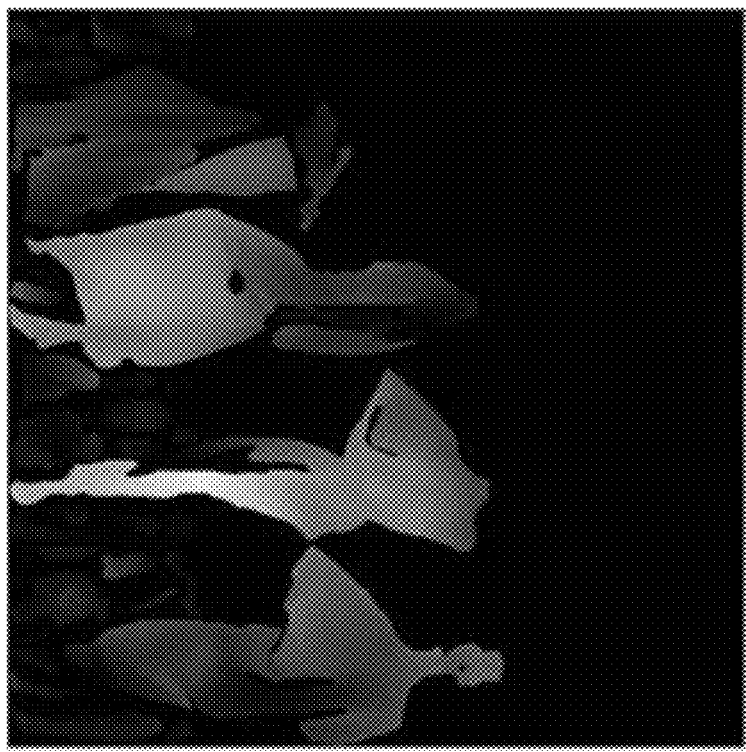
FIG. 5 illustrates an example of a geometry image in accordance with an embodiment.

In embodiments, the geometry image generation module 306 generates the geometry image 352 and the texture image generation module 308 generates the texture image 356, based on the input point cloud frame 350 and the occupancy map 334. An example of the geometry image 352 is illustrated in FIG. 5 and an example of the texture image 356 is illustrated in FIG. 6. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

As described above, an input cloud may be segmented into several patches and packed into three 2D images, such as an occupancy map, geometry image, and texture image. These images are then compressed by a coding standard such as, for example, HEVC.

It is advantageous for a point cloud compression system to use a region of interest (ROI) in the form of a 3D bounding box. Accordingly, it is advantageous for a content-aware point cloud compression system to fulfill all (or some) of the below features: (1) The ROI is coded with a higher quality than other parts of the point-cloud; (2) the ROI is coded independently from other parts of the point-cloud to facilitate spatial random-access without full-decoding; (3) the independent coding of ROI is harmonized with any system requirements regarding independent (parallel) encoding/decoding; and (4) multiple ROIs is supported.

Some embodiments of the present disclosure may include one or more of the above features. Embodiments of the present disclosure may be used separately or combined in any order. Further, each of the embodiments of the present disclosure, including methods, encoders, and decoders, may be implemented by processing circuitry (e.g., one or more processors or one or more integrated circuits). In embodiments, one or more processors may execute a program that is stored in a non-transitory computer-readable medium to perform the functions of methods, encoders, and decoders of the present disclosure.

Embodiments of the present disclosure may accomplish, for example, the following point cloud compression features: (1) Parallel encoding and decoding. Embodiments of the present disclosure may provide a parallel processing implementation with low cost in terms of bitrate overhead. (2) Spatial random access. Embodiments of the present disclosure may decode a point cloud corresponding to a region without having to decode an entire bitstream of a video stream.

According to some embodiments, one or more of the above features may be accomplished with a sub-frame design as described below.

Figure 8:
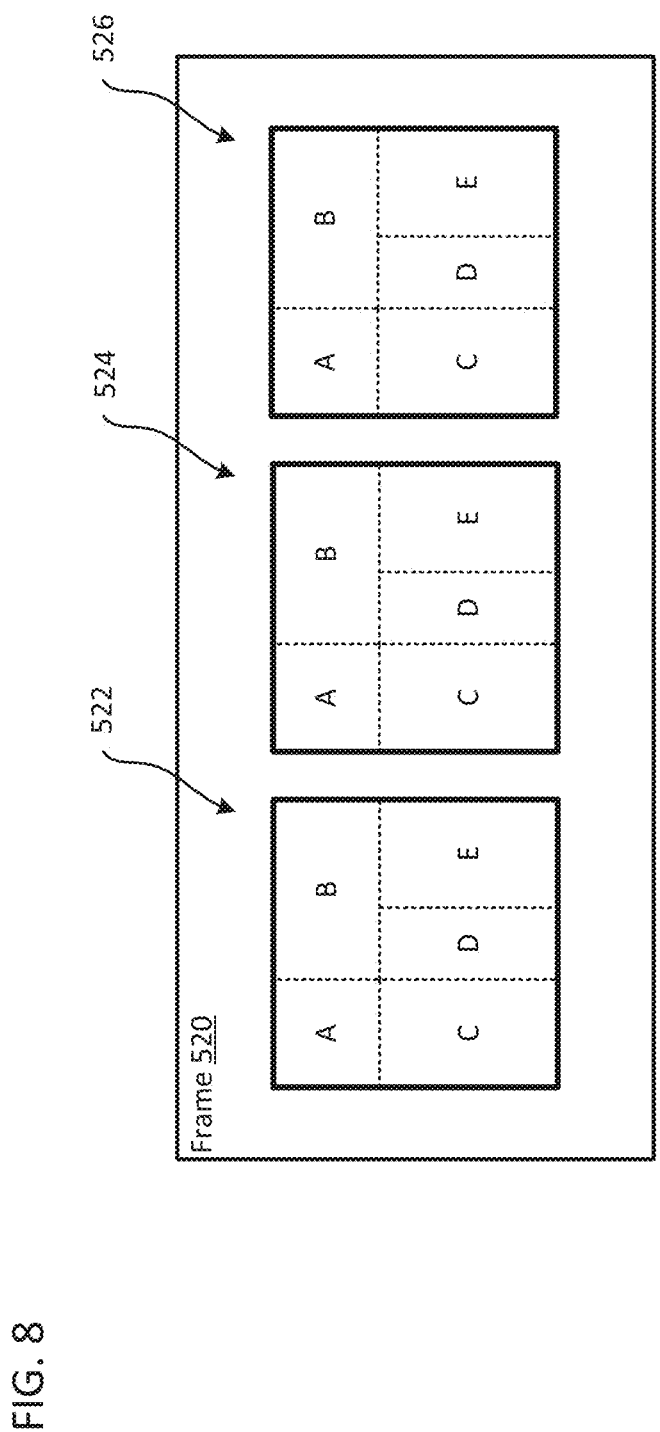
FIG. 8 is a diagram illustrating components of a frame in accordance with an embodiment.

With reference to FIG. 7, a video stream may comprise a coded version of a plurality of frames 520 wherein each of the frames 520 corresponds to a respective 3D point cloud frame 510 that may be obtained by, for example, the video source 201, and may be viewable by, for example, the display 212. Each of the frames 520 may include a plurality of two-dimensional pictures that are layers of the frame, wherein each picture of the frame indicates a specific attribute of the corresponding 3D point cloud frame 510. For example, with reference to FIG. 8 which illustrates a single frame 520, the plurality of two-dimensional pictures may include three pictures, such as the geometry image 522, the texture image 524, and the occupancy map 526. Such pictures may be the same or share similarities with the geometry image 352, the texture image 356, and the occupancy map 334 described above.

Each frame 520 may be partitioned into sub-frames, wherein each sub-frame includes a part of each of the plurality of two-dimensional pictures (e.g. a part of the geometry image, a part of the texture image, and a part of the occupancy map). One or more of the sub-frames may correspond to an ROI. For example, with reference to FIG. 8, the frame 520 may include a subframe A, a subframe B, a subframe C, a subframe D, and a subframe E. Each of the sub-frames A-E include a portion of the geometry image 522, the texture image 524, and the occupancy map 526. One or more of the sub-frames A-E may correspond to an ROI.

In some embodiments, a sub-frame (e.g. any of subframes A-E) may be a rectangular region or a group of tiles. In a case where a sub-frame comprises multiple tiles, the sub-frame may have a rectangular or non-rectangular shape. In an embodiment, a sub-frame may or may not be partitioned into multiple tiles. In a case where the sub-frame is partitioned into multiple tiles, each component of the sub frame (e.g. YUV, XYZ, occupancy map) may have identical tile partitions.

In some embodiments, tiles in the sub-frames can be combined into a rectangular or non-rectangular tile group, but tiles belonging to different sub-frames cannot be grouped. In an embodiment, the tile groups may use the tile group design of VVC.

In some embodiments, 3D bounding box information corresponding to a sub-frame may be signaled or not signaled. The 3D bounding box information may, for example, specify a 3D position of a sub-frame in a point cloud. For example, with reference to FIGS. 7-8, any ones of areas 512 of the 3D point cloud frame 510 may correspond to the 3D bounding box and the corresponding position of one of the sub-frames A-E of the frame 520 within the 3D point cloud frame 510.

In some embodiments, any decoding or rendering process (e.g. in-loop filtering, motion compensation) across sub-picture boundaries may be disallowed or allowed. A sub-picture may refer to a sub-portion of a picture (e.g. an area A, B, C, D, or E of a picture 522, 525, or 526 illustrated in FIG. 8). In some embodiments the boundary of a sub-frame may be extended and padded for motion compensation. In some embodiments, a flag indicating whether the boundary is extended or not is signaled in a Sequence Parameter Set (SPS) of the video bitstream.

In some embodiments, the decoded sub-frame may or may not be resampled to be output. In some embodiments, the spatial ratio between the decoded sub-frame size and the output sub-frame size may be signaled in SPS and may be used to calculate the resampling ratio. In some embodiments, the resampling operations (e.g. adaptive resolution changes) may or may not be applied.

In some embodiments, partitioning information is signaled in a frame parameter set of the video bitstream, which may be activated by a frame. The partitioning information may, for example, indicate whether and how a frame is partitioned into a plurality of sub-frames. In some embodiments, the partitioning information can be updated within a coded video sequence. In some embodiments, the same partition information may be shared and used by multiple frames, pictures, slices, tile groups, and VCL NAL units with different components.

Provided below is example code of an embodiments of the present disclosure that may be implemented in, for example, V-PCC. As shown below, the code may be provided in a frame parameter set. In an embodiment, the frame parameter set may be provided, in a coded video stream, by an encoder to a decoder.

| frame_parameter_set ( ) { | Descriptor |
|---|---|
|   frame_partitioning_enabled_flag | |
|   if( frame_partitioning_enabled_flag) { | |
|     tile_info_present_flag | u(1) |
|     if( tile_info_present_flag ) { | |
|       num_tile_columns_minus1 | ue(v) |
|       num_tile_rows_minus1 | ue(v) |
|       uniform_tile_spacing_flag | u(1) |
|       if( !uniform_tile_spacing_flag ) { | |
|         for( i =0; i < num_tile_columns_minus1; i++ ) { | |
|           tile_column_width_minus1[ 1 ] | ue(v) |
|         for( i = 0; i < num_tile_rows_minus1; i++ ) { | |
|           tile_row_height_minus1[ i ] | ue(v) |
|         } | |
|       single_tile_per_sub_frame_flag | u(1) |
|       if(!single_tile_per_sub_frame_flag ) { | |
|         num_sub_frames_in_frame_minus1 | ue(v) |
|         3D_bounding_box_info_present_flag | u(1) |
|     rect_sub_frame_flag | u(1) |
|       for( i = 0; i <= num_sub_frame_in_frame_minus1; i++ ) { | |
|     if(rect_sub_frame_flag) { | |
|       top_left_tile_idx[ i ] | u(v) |
|       bottom_right_tile_idx[ i ] | u(v) |
|     } else { | |
|       num_tile_in_sub_frame_minus1 | u(1) |
|     } | |
|     if(3D_bounding_box_info_present_flag ) { | |
|       3D_bounding_box_x[ i ] | u(16) |
|       3D_bounding_box_y[ i ] | u(16) |
|       3D_bounding_box_z[ i ] | u(16) |
|       3D_bounding_box_dx[ i ] | ue(v) |
|       3D_bounding_box_dy[ i ] | ue(v) |
|       3D_bounding_box_dz[ i ] | ue(v) |
|     } | |
|   } | |

```
frame_parameter_set ( ) {                                              Descriptor
    }
  }
  else {
    num_sub_frame_in_frame_minus1                                      ue(v)
    3D_bounding_box_info_present_flag                                  u(i)
    for( i = 0; i <= num_sub_frame_in_frame_minus1; i++ ) {
      sub_frame_x[ i ]                                                 u(16)
      sub_frame_y[ i ]                                                 u(16)
      sub_frame_dx[ i ]                                                ue(v)
      sub_frame_dy[ i ]                                                ue(v)
      if(3D_bounding_box_info_present flag) {
        3D_bounding_box_x[ i ]                                         u(16)
        3D_bounding_box_y[ i ]                                         u(16)
        3D_bounding_box_z[ i ]                                         u(16)
        3D_bounding_box_dx[ i ]                                        ue(v)
        3D_bounding_box_dy[ i ]                                        ue(v)
        3D_bounding_box_dz[ i ]                                        ue(v)
      }
    }
  }
    signalled_bounding_box_id_flag                                     u(1)
    if( signalled_bounding_box_id_flag) {
      signalled_bounding_box_length_minus1                             ue(v)
      for( i = 0; i <= num_bounding_box_in_frame_ minus1; i++ )
        bounding_box_id[ i ]                                           u(v)
    }
    Independent_decoding_sub_frame_enabled_flag                        u(1)
    post_processing_across_bounding_box_disabled_flag                  u(1)
  }
  byte_alignment( )
}
```

Semantics of the above code is described below.

"frame_partitioning_enabled_flag" equal to 1 specifies that the frame is partitioned into multiple sub-regions (e.g. sub-frames). The sub-bitstream corresponding to each sub-region is accessible and extractable from the entire bitstream. Each region shall be able to be independently decoded. "frame_partitioning_enabled_flag" equal to 0 specifies that the frame may or may not be partitioned into multiple sub-regions (e.g. sub-frames).

"tile_info_present_flag" equal to 1 specifies that each component bitstream contains the tile information, which is aligned with bounding box information for spatial random access and parallel processing. "tile_info_present_flag" equal to 0 specifies that each 2-dimensional bounding box is explicitly signaled on pixel level.

"num_tile_columns_minus1" plus 1 specifies the number of tile columns partitioning the frame.

"num_tile_rows_minus1" plus 1 specifies the number of tile rows partitioning the frame.

"uniform_spacing_flag" equal to 1 specifies that tile column boundaries and likewise tile row boundaries are distributed uniformly across the frame. "uniform_spacing_flag" equal to 0 specifies that tile column boundaries and likewise tile row boundaries are not distributed uniformly across the frame, but signaled explicitly using the syntax elements "column_width_minus1[i]" and "row_height_minus1[i]".

"column_width_minus1 [i]" plus 1 specifies the width of the i-th tile column in units of CTBs.

"row_height_minus1[i]" plus 1 specifies the height of the i-th tile column in units of CTBs.

"single_tile_per_sub_frame_flag" equal to 1 specifies that each 2D bounding box that is indicated in this frame parameter set includes one tile. "single_tile_per_sub_frame_flag" equal to 0 specifies that each 2D bounding box that is indicated in this frame parameter set may include more than one tile.

"num_sub_frame_in_frame_minus1" plus 1 specifies the number of two-dimensional bounding boxes in each frame referring to the frame parameter set.

"3D_bounding_box_info_present_flag" equal to 1 specifies that three-dimensional bounding box information is present. "3D_bounding_box_info_present_flag" equal to 0 specifies that three-dimensional bounding box information is not present.

"rect_sub_frame_flag" equal to 0 specifies that tiles within each sub-frame are in raster scan order. "rect_tile_group_flag" equal to 1 specifies that tiles within each sub-frame cover a rectangular region of the frame.

"num_tiles_in_sub_frame_minus1" plus 1, when present, specifies the number of tiles in the non-rectangular sub-picture.

"top_left_tile_idx[i]" specifies the tile index of the tile located at the top-left corner of the i-th 2-D bounding box.

"bottom_right_tile_idx[i]" specifies the tile index of the tile located at the bottom-right corner of the i-th 2-D bounding box.

"3D_bounding_box_x[i]", "3D_bounding_box_y[i]", and "3D_bounding_box_z[i]" specify the three dimensional position of the i-th three dimensional bounding box corresponding to the i-th two dimensional bounding box, used for the volumetric representation of the point cloud data.

"3D_bounding_box_dx[i]", "3D_bounding_box_dy[i]", and "3D_bounding_box_dz[i]" specify respectively the length of the specific 3D bounding box in each x, y, z domain.

"sub_frame_x[i]" and "sub_frame_y[i]" specify the two dimensional position of the i-th two dimensional bounding box.

"sub_frame_dx[i]" and "sub_frame_dy[i]" specify respectively the width and the height of the specific 2D bounding box.

"signalled_bounding_box_id_flag" equal to 1 specifies that the bounding box ID for each bounding box is signalled. "signalled_bounding_box_index_flag" equal to 0 specifies that bounding box IDs are not signalled.

"signalled_bounding_box_id_length_minus1" plus 1 specifies the number of bits used to represent the syntax element bounding box id[i]. The value of "signalled_bounding_box_id_length_minus1" shall be in the range of 0 to 15, inclusive.

"bounding_box_id[i]" specifies the bounding box ID of the i-th bounding box. The length of the "bounding_box_id [i]" syntax element is "bounding_box_id_length_minus1"+1 bits.

"Independent_decoding_sub_frame_enabled_flag" equal to 1 specifies that each sub_frame may or may not be independently decoded without inter sub-frame operations. "Independent_decoding_sub_frame_enabled_flag" equal to 0 specifies that each sub_frame cannot be independently decoded without inter sub-frame operations. The inter sub-frame operation includes motion compensation and in-loop filtering across boundaries of sub-frames. If not present, the value of "Independent_decoding_sub_frame_enabled_flag" is inferred to be equal to 0.

"post_processing_across_bounding_box_enabled_flag" equal to 1 specifies that any post-processing after decoding the video bitstreams is enabled across the boundaries of sub_frames. "post_processing_across_bounding_box_enabled_flag" equal to 0 specifies that any post-processing after decoding the video bitstreams is disabled across the boundaries of sub_frames. The post processing may include any operations to generate point cloud data from the decoded video sequences.

Figure 9:
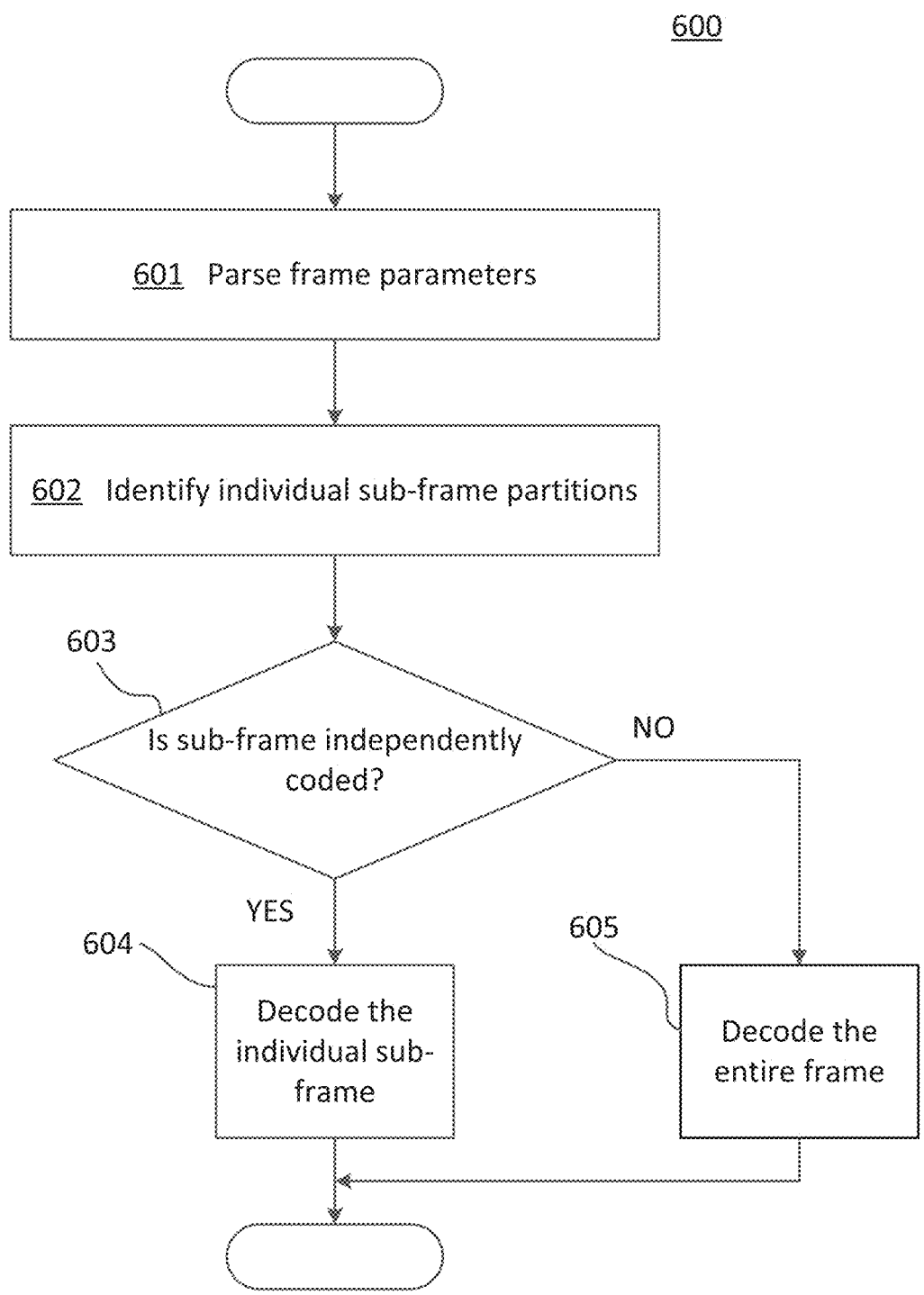
FIG. 9 is a flow diagram illustrating a process performed by an embodiment.

With reference to FIG. 9, embodiments of the present disclosure may perform a decoding process of coded point cloud data with sub-frame partition.

After receiving at least a portion of a video stream, frame parameters are parsed (601). Following, individual sub-frame partitions are identified. With respect to one or more of the sub-frames, it may be determined whether the sub-frame is independently coded (603). In a case where an individual sub-frame is determined to be independently coded, the individual sub-frame may be decoded independently (604). In a case where there are no independently coded sub-frames, the entire frame may be decoded (605). In embodiments, the decoding of the sub-frame or frame may be performed by the decoder 210 illustrated in FIG. 4.

In embodiments, a device 700 may comprise memory storing computer program code that, when performed by at least one processor, may cause an at least one processor to perform the functions of the decoders and encoders described above.

Figure 10:
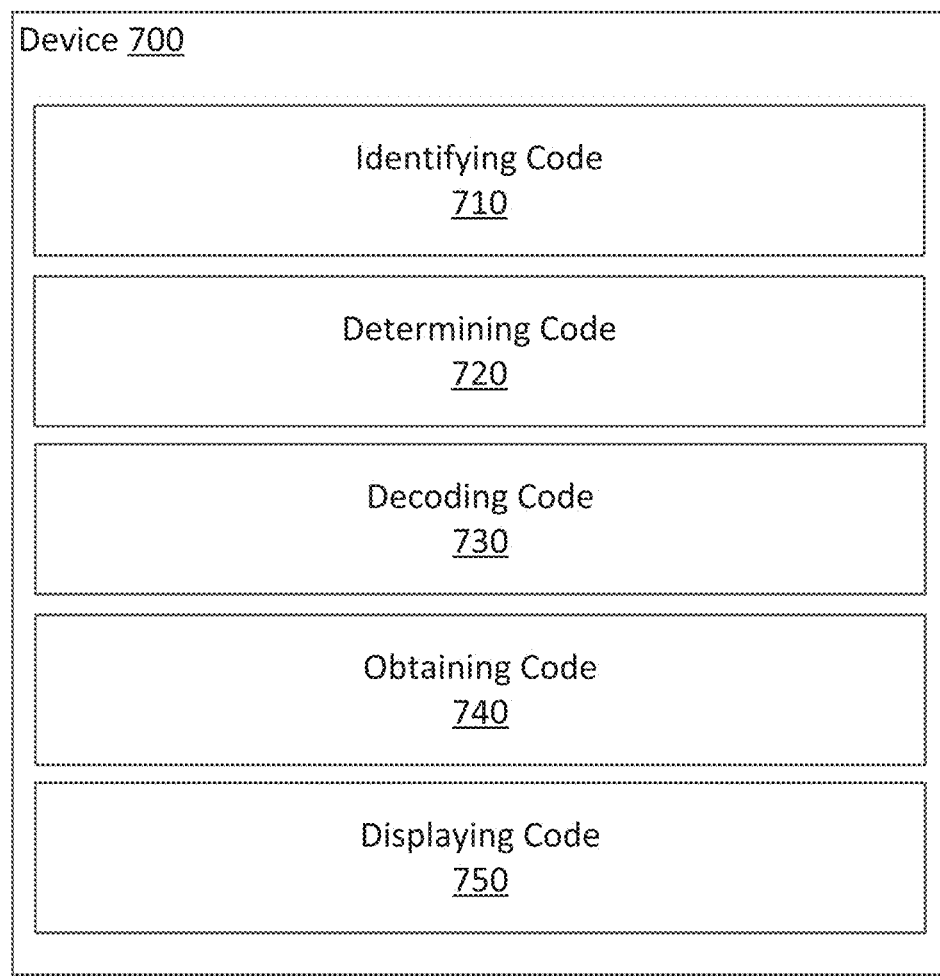
FIG. 10 is a diagram illustrating a device in accordance with an embodiment.

For example, with reference to FIG. 10, the computer program code of the device 700 may comprise identifying code 710, decoding code 730, obtaining code 740, and displaying code 750.

The identifying code 710 may be configured to cause the at least one processor to identify one or more sub-frames using frame partition information provided to the device 700. The frame partition information may be, for example, any of the information described above that indicates characteristics (e.g. the number, size, shape, and coding dependencies) of the sub-frames within a frame.

The decoding code 730 may be configured to cause the at least one processor to decode a sub-frame identified. In embodiments, the decoding code 730 may be configured to perform the functions of the decompression modules of the decoder 210 illustrated in FIG. 4 to decode the sub-frame.

The obtaining code 740 may be configured to cause the at least one processor to obtain, after decoding the sub-frame identified, a point cloud by using 3D bounding box information corresponding to the sub-frame identified. In embodiments, the obtaining code 740 may be configured to perform the functions of the geometry reconstruction module 412, the smoothing module 414, the texture reconstruction module 416, and the color smoothing module 418 of the decoder 210 illustrated in FIG. 4 to obtain a point cloud.

The displaying code 750 may be configured to cause the at least one processor to display a 3D image corresponding to the point cloud on a display.

In some embodiments, the computer program code may also include determining code 720. The determining code 720 may be configured to cause the at least one processor to determine whether the sub-frame is independently coded, and the decoding code 730 may be configured to cause the at least one processor to decode the sub-frame independently from other sub-frames of the plurality of sub-frames, in a case where the sub-frame is determined to be independently coded.

The techniques, described above, can be implemented as computer software using computer-readable instructions and physically stored in one or more computer-readable media. For example, FIG. 11 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
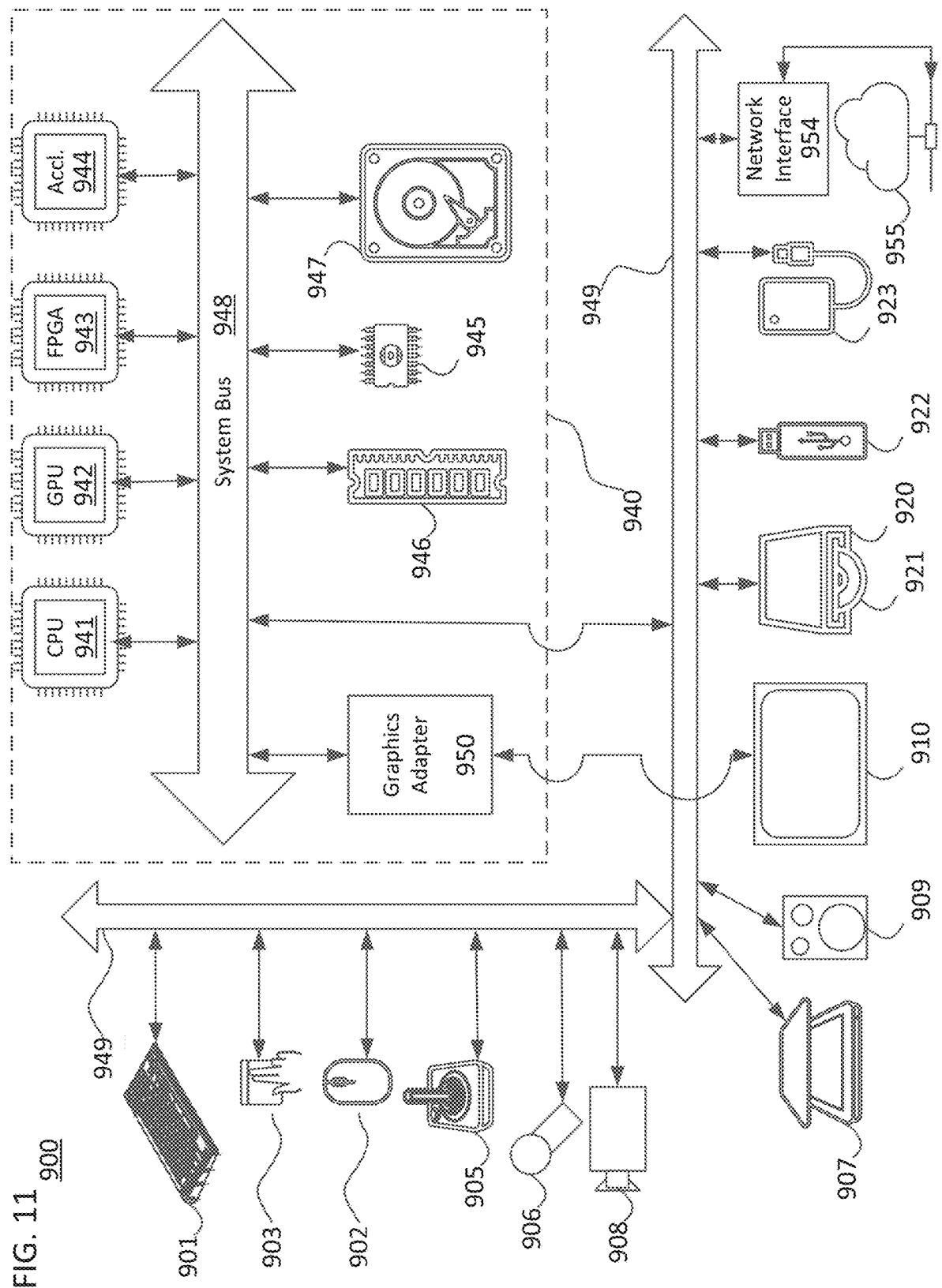
FIG. 11 is a diagram of a computer system suitable for implementing embodiments.

The components shown in FIG. 11 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

What is claims is:

1. A method performed by at least one processor, the method comprising:
   encoding a video stream, the encoded video stream including:
      a frame of a plurality of two-dimensional (2D) pictures that are layers of the frame, each of the plurality of 2D pictures having a respective attribute of a same three-dimensional (3D) representation,
      frame partition information that indicates the frame is partitioned into a plurality of sub-frames, each of the plurality of sub-frames being a respective combination of a sub-region of each picture of the plurality of 2D pictures, and
      3D bounding box information that specifies a 3D position corresponding to a sub-frame of the plurality of sub-frames; and
   sending the encoded video stream to a decoder,
   wherein the frame partition information, of the encoded video stream, includes 2D bounding box information that specifies at least one among a position and boundary of the sub-frame in the frame,
   the frame partition information further includes a syntax element that indicates whether a 2D bounding box specified in the 2D bounding box information includes only one tile, and
   the 3D bounding box information specifies a 3D position of the 2D bounding box specified in the 2D bounding box information.

2. The method according to claim 1, wherein
   the frame partition information further includes a syntax element that indicates whether an ID of the 2D bounding box specified in the 2D bounding box information is signaled.

3. The method according to claim 1, wherein
   the encoding the video stream comprises generating the encoded video stream, including the 3D bounding box information, based on a point cloud.

4. The method according to claim 3, wherein
   the plurality of 2D pictures includes a first picture, a second picture, and a third picture, the first picture being a texture image, the second picture being a geometry image, and the third picture being an occupancy map.

5. The method according to claim 1, wherein the encoding the video stream comprises generating the encoded video stream, including the 3D bounding box information, based on a point cloud.

6. The method according to claim 5, wherein
   the plurality of 2D pictures includes a first picture, a second picture, and a third picture, the first picture being a texture image, the second picture being a geometry image, and the third picture being an occupancy map.

7. The method according to claim 1, wherein the encoding the video stream comprises signaling in the encoded video stream whether the sub-frame may be independently decoded from other sub-frames of the plurality of sub-frames.

8. The method according to claim 1, wherein
   the encoded video stream includes a frame parameter set that includes the frame partition information and the 3D bounding box information.

9. The method according to claim 1, wherein
   the plurality of 2D pictures includes a first picture, a second picture, and a third picture, the first picture being a texture image, the second picture being a geometry image, and the third picture being an occupancy map.

10. The method according to claim 1, wherein
    the encoded video stream further includes an additional frame of a plurality of 2D pictures that are layers of the additional frame, each of the plurality of 2D pictures of the additional frame having a respective attribute of a same additional 3D representation, and
    the frame partition information indicates that the additional frame is partitioned into a plurality of sub-frames.

11. A system comprising:
    memory configured to store computer program code; and
    at least one processor configured to access the computer program code, and operate as instructed by the computer program code, wherein
    the computer program code, when executed by the at least one processor, causes the at least one processor to encode a video stream and send the encoded video stream to a decoder, and
    the encoded video stream includes:
       a frame of a plurality of two-dimensional (2D) pictures that are layers of the frame, each of the plurality of 2D pictures having a respective attribute of a same three-dimensional (3D) representation,
       frame partition information that indicates the frame is partitioned into a plurality of sub-frames, each of the plurality of sub-frames being a respective combination of a sub-region of each picture of the plurality of 2D pictures, and
       3D bounding box information that specifies a 3D position corresponding to a sub-frame of the plurality of sub-frames,
    wherein the frame partition information, of the encoded video stream, includes 2D bounding box information that specifies at least one among a position and boundary of the sub-frame in the frame,
    the frame partition information further includes a syntax element that indicates whether a 2D bounding box specified in the 2D bounding box information includes only one tile, and
    the 3D bounding box information specifies a 3D position of the 2D bounding box specified in the 2D bounding box information.

12. The system according to claim 11, wherein
    the frame partition information further includes a syntax element that indicates whether an ID of the 2D bounding box specified in the 2D bounding box information is signaled.

13. The system according to claim 11, wherein
    the computer program code, when executed by the at least one processor, further causes the at least one processor to generate the encoded video stream, including the 3D bounding box information, based on a point cloud.

14. The system according to claim 13, wherein
the plurality of 2D pictures includes a first picture, a second picture, and a third picture, the first picture being a texture image, the second picture being a geometry image, and the third picture being an occupancy map.

15. The system according to claim 11, wherein
the computer program code, when executed by the at least one processor, further causes the at least one processor to generate the encoded video stream, including the 3D bounding box information, based on a point cloud.

16. The system according to claim 15, wherein
the plurality of 2D pictures includes a first picture, a second picture, and a third picture, the first picture being a texture image, the second picture being a geometry image, and the third picture being an occupancy map.

17. The system according to claim 11, wherein
the computer program code, when executed by the at least one processor, further causes the at least one processor to signal in the encoded video stream whether the sub-frame may be independently decoded from other sub-frames of the plurality of sub-frames.

18. The system according to claim 11, wherein
the encoded video stream includes a frame parameter set that includes the frame partition information and the 3D bounding box information.

19. The system according to claim 11, wherein
the plurality of 2D pictures includes a first picture, a second picture, and a third picture, the first picture being a texture image, the second picture being a geometry image, and the third picture being an occupancy map.

20. A non-transitory computer-readable medium storing computer instructions that, when executed by at least one processor, cause the at least one processor to:
encode a video stream that includes:
a frame of a plurality of two-dimensional (2D) pictures that are layers of the frame, each of the plurality of 2D pictures having a respective attribute of a same 3D representation,
frame partition information that indicates the frame is partitioned into a plurality of sub-frames, each of the plurality of sub-frames being a respective combination of a sub-region of each picture of the plurality of 2D pictures, and
3D bounding box information that specifies a 3D position corresponding to a sub-frame of the plurality of sub-frames; and
send the encoded video stream to a decoder,
wherein the frame partition information, of the encoded video stream, includes 2D bounding box information that specifies at least one among a position and boundary of the sub-frame in the frame,
the frame partition information further includes a syntax element that indicates whether a 2D bounding box specified in the 2D bounding box information includes only one tile, and
the 3D bounding box information specifies a 3D position of the 2D bounding box specified in the 2D bounding box information.

* * * * *